United States Patent
Yu et al.

(10) Patent No.: US 10,193,120 B2
(45) Date of Patent: Jan. 29, 2019

(54) METHOD FOR FORMING ADHESION LAYER FOR SECONDARY BATTERY

(71) Applicant: LG CHEM, LTD., Seoul (KR)

(72) Inventors: Hyung-Kyun Yu, Daejeon (KR); Sun-Mi Jin, Daejeon (KR); Joo-Sung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 565 days.

(21) Appl. No.: 14/432,692

(22) PCT Filed: Nov. 4, 2014

(86) PCT No.: PCT/KR2014/010522
§ 371 (c)(1),
(2) Date: Mar. 31, 2015

(87) PCT Pub. No.: WO2015/065159
PCT Pub. Date: May 7, 2015

(65) Prior Publication Data
US 2015/0228951 A1    Aug. 13, 2015

(30) Foreign Application Priority Data

Nov. 4, 2013  (KR) .................. 10-2013-0133077
Nov. 4, 2014  (KR) .................. 10-2014-0151949

(51) Int. Cl.
| | | |
|---|---|---|
| *H01M 2/14* | (2006.01) |
| *H01M 2/16* | (2006.01) |
| *H01M 4/62* | (2006.01) |
| *H01M 4/04* | (2006.01) |
| *H01M 10/02* | (2006.01) |
| *C09J 5/00* | (2006.01) |

(52) U.S. Cl.
CPC ............ *H01M 2/168* (2013.01); *C09J 5/00* (2013.01); *H01M 2/145* (2013.01); *H01M 2/1686* (2013.01); *H01M 4/0402* (2013.01); *H01M 4/62* (2013.01); *H01M 10/02* (2013.01)

(58) Field of Classification Search
None
See application file for complete search history.

(56) References Cited

U.S. PATENT DOCUMENTS

| | | | |
|---|---|---|---|
| 2008/0029214 A1* | 2/2008 | Hable ............. | C08J 5/121 156/326 |
| 2010/0190063 A1 | 7/2010 | Fukumoto et al. | |
| 2012/0132273 A1 | 5/2012 | Lee et al. | |
| 2014/0151733 A1 | 6/2014 | Koike et al. | |
| 2014/0171851 A1* | 6/2014 | Addison ........... | A61F 13/025 602/55 |

(Continued)

FOREIGN PATENT DOCUMENTS

| | | |
|---|---|---|
| JP | 2001-357839 A | 12/2001 |
| JP | 2002-15773 A | 1/2002 |

(Continued)

*Primary Examiner* — Alix E Eggerding
(74) *Attorney, Agent, or Firm* — Birch, Stewart, Kolasch & Birch, LLP

(57) ABSTRACT

The present disclosure improves a quality of the secondary battery by minimizing a size of the adhesion layer between the electrode and the separator to improve the transfer of lithium ions of which movement was obstructed by the adhesion layer.

14 Claims, 13 Drawing Sheets

(56) References Cited

U.S. PATENT DOCUMENTS

| | | | | |
|---|---|---|---|---|
| 2014/0242470 A1* | 8/2014 | Ogata | ............... | H01M 4/88 |
| | | | | 429/246 |
| 2015/0099062 A1* | 4/2015 | Tseng | ............... | H01M 4/926 |
| | | | | 427/115 |

FOREIGN PATENT DOCUMENTS

| | | |
|---|---|---|
| JP | 2005-7848 A | 1/2005 |
| JP | 5243672 B1 | 7/2013 |
| JP | 2013-219005 A | 10/2013 |
| KR | 2002-0089077 A | 11/2002 |
| KR | 10-2008-0017015 A | 2/2008 |
| KR | 10-2011-0056028 A | 5/2011 |
| KR | 10-2013-0091842 A | 8/2013 |
| KR | 10-1292656 B1 | 8/2013 |
| KR | 10-2013-0123744 A | 11/2013 |
| WO | WO 99/31751 A1 | 6/1999 |
| WO | WO 99/41797 A1 | 8/1999 |
| WO | WO 99/48164 A | 9/1999 |

\* cited by examiner

METHOD FOR FORMING ADHESION LAYER FOR SECONDARY BATTERY

TECHNICAL FIELD

The present disclosure relates to a method for forming an adhesion layer for a secondary battery, and more particularly, to a method for forming an adhesion layer that forms an adhesion layer between a separator and an electrode of a secondary battery.

The present application claims priority to Korean Patent Application No. 10-2013-0133077 filed in the Republic of Korea on Nov. 4, 2013 and Korean Patent Application No. 10-2014-0151949 filed in the Republic of Korea on Nov. 4, 2014, the disclosures of which are incorporated herein by reference.

BACKGROUND ART

Lithium secondary batteries are being widely used in various types of portable electronic devices including personal computers, camcorders, mobile phones, portable CD players, and personal digital assistants (PDAs), due to having many advantages of high energy density and high operating voltage as well as excellent storage and life characteristics.

Generally, a lithium secondary battery includes a cylindrical or prismatic case, an electrolyte, and an electrode assembly received in the case. Here, the electrode assembly includes a stack of a cathode, separator, and an anode, and has a jelly-roll type wind structure or a stack structure.

The electrode assembly composed of cathode/separator/anode may have merely a stack structure, but may have a structure in which a plurality of electrodes (cathodes and anodes) are stacked with a separator interposed therebetween and joined with each other by heat/pressure. In this case, the joining of the electrode and the separator is achieved by applying heat/pressure with an adhesion layer coated on the separator and the electrode facing each other. Here, the separator is generally made by an extrusion molding process using a polyolefine resin as a raw material, and to improve the properties including the adhesive strength with the electrode, a material such as a binder or the like may be coated thereon.

Conventionally, a gel polymer coating technique, an electrospinning technique, or the like, was used to coat the binder material on the separator.

However, these exemplary coating techniques involve coating the binder material over the entire separator surface, which hinders the transport of lithium ions. That is, as the coating layer of the binder material formed on the separator is adhered to the electrode where lithium ions transfer, the coating layer is a factor discouraging the lithium ion transfer.

DISCLOSURE

Technical Problem

The present disclosure is designed to solve the above problem, and therefore, the present disclosure is directed to providing a method for forming an adhesion layer by which a size of an adhesion layer for joining a separator with an electrode is minimized to improve the ion transfer, an adhesion layer composite or an electrode assembly comprising the adhesion layer, and a mold used to form the adhesion layer.

These and other objects and advantages of the present disclosure will be understood by the following description. Also, it will be apparent that the objects and advantages of the present disclosure may be realized by means or methods stated in the appended claims, and combinations thereof.

Technical Solution

To achieve the above object, a method for forming an adhesion layer of a secondary battery according to one aspect of the present disclosure includes preparing a mask having openings which are open vertically, etching a photosensitive film through the mask to form grooves corresponding to the openings of the mask in the photosensitive film, pouring polydimethylsiloxane onto the photosensitive film having the grooves, curing the polydimethylsiloxane, and separating the cured polydimethylsiloxane from the photosensitive film to manufacture a polydimethylsiloxane mold having a concavo-convex part, coating a polymer binder slurry on the polydimethylsiloxane mold having the concavo-convex part, and transferring the polymer binder slurry coated on the polydimethylsiloxane mold onto a surface of a separator or an electrode of a secondary battery to form an adhesion layer having a cavity part on the surface of the separator or the electrode, the cavity part being open vertically.

The preparing of the mask may include preparing the mask with a regular pattern by the openings having a regular arrangement.

The concavo-convex part may include protrusions protrusively formed at locations corresponding to the grooves formed in the photosensitive film, and recesses formed relatively inward when compared to the protrusions.

The coating of the polymer binder slurry may include coating the polymer binder slurry on the protrusions or the recesses.

As an example, the coating of the polymer binder slurry may include coating the polymer binder slurry on the recesses, and the forming of the adhesion layer may include forming the adhesion layer having the cavity part with a same pattern as the regular pattern formed by the openings.

As another example, the coating of the polymer binder slurry may include coating the polymer binder slurry on the protrusions, and the forming of the adhesion layer may include forming the adhesion layer having the cavity part with a reverse pattern of the regular pattern formed by the openings.

The preparing of the mask may include preparing the mask having the openings of a rectangular shape.

The openings may have a standard from 0.5 μm*0.5 μm to 2 μm*2 μm in width and length.

The preparing of the mask may include preparing the mask using the regular pattern pre-designed through CAD.

Preferably, the mask may be a chrome mask.

More preferably, the method may further include, before the coating of the polymer binder slurry, performing $O_2$ plasma surface treatment or corona surface treatment of the polydimethylsiloxane mold.

The forming of the grooves in the photosensitive film may include photoetching the photosensitive film to form the grooves.

The forming of the adhesion layer may include transferring the polymer binder slurry coated on the polydimethylsiloxane mold onto a porous coating layer including inorganic particles formed on the surface of the separator of the secondary battery, to form the adhesion layer having the vertically opened cavity part on the porous coating layer.

To achieve the above object, an adhesion layer composite according to another aspect of the present disclosure includes an adhesion layer having a cavity part formed on a surface of the adhesion layer composite, the cavity part being open vertically and having a regular pattern.

The adhesion layer composite may include an electrode of a secondary battery and the adhesion layer, and the adhesion layer may be formed on a surface of the electrode of the secondary battery.

The adhesion layer composite may include a separator of a secondary battery and the adhesion layer, and the adhesion layer may be formed on a surface of the separator of the secondary battery.

The adhesion layer may be formed on a porous coating layer including inorganic particles formed on the surface of the separator of the secondary battery.

The adhesion layer may include the cavity part and a binder region made of a binder polymer, and the cavity part or the binder region may have a regular pattern.

The binder region or the cavity part may have a regular repeating pattern of rectangles, when viewed from a top.

In this instance, the binder region or the cavity part may have a standard from 0.5 μm*0.5 μm to 2 μm*2 μm in width and length.

A thickness of the adhesion layer may be from 0.5 μm to 2 μm.

To achieve the above object, an electrode assembly according to another aspect of the present disclosure includes the above adhesion layer composite.

To achieve the above object, a polydimethylsiloxane mold according to another aspect of the present disclosure is a mold used to transfer a polymer binder slurry onto a surface of a separator or an electrode, and the polydimethylsiloxane mold has a concavo-convex part with a regular pattern formed on a surface.

The concavo-convex part may be formed in a regularly repeating pattern of protrusions protrusively formed in a perpendicular direction to the surface and recesses formed inward in the perpendicular direction to the surface.

A height of the protrusions may be from 0.5 μm to 2 μm.

The protrusions may have a standard from 0.5 μm*0.5 μm to 2 μm*2 μm in width and length.

Advantageous Effects

The present disclosure has an advantage of improved quality of a secondary battery by minimizing a size, in particular, a surface area of an adhesion layer between an electrode and a separator to improve the transfer of lithium ions of which movement was obstructed by the adhesion layer.

Also, because an adhesion layer with a regular fine pattern is formed on a surface of an electrode or a separator, thereby saving a raw material for the adhesion layer in the manufacture of a secondary battery, the present disclosure has a benefit of reducing a cost incurred in manufacturing the secondary battery, over a related art forming an adhesive coating layer using a binder material.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR CARRYING OUT THE INVENTION

The foregoing objects, features, and advantages will become apparent from the following detailed description with reference to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily obscure the essence of the disclosure, its detailed description is omitted herein. Hereinafter, an exemplary embodiment of the present disclosure is described in detail with reference to the accompanying drawings.

Figure 1:
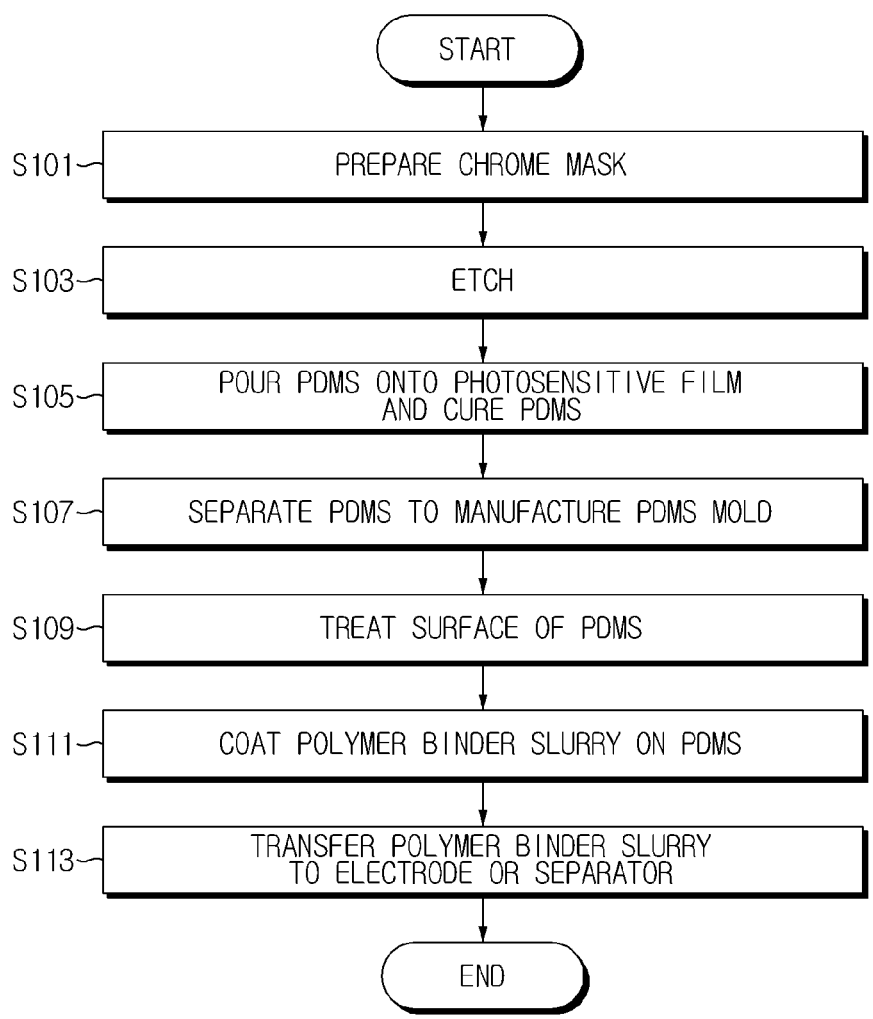
FIG. 1 is a flowchart illustrating a method for forming an adhesion layer in a secondary battery according to an exemplary embodiment of the present disclosure.
Figure 2:
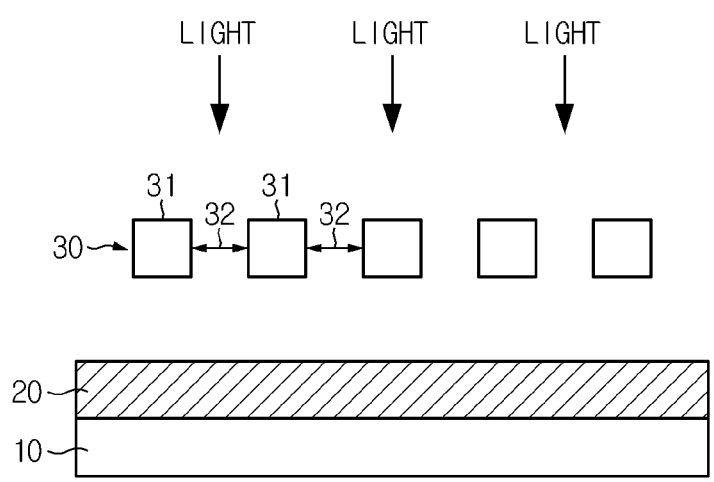
FIGS. 2 through 5 are diagrams illustrating each step of a process of manufacturing a polydimethylsiloxane (PDMS) mold with a concavo-convex part according to an exemplary embodiment of the present disclosure.

FIG. 1 is a flowchart illustrating a method for forming an adhesion layer in a secondary battery according to an exemplary embodiment of the present disclosure.

FIGS. 2 through 5 are diagrams illustrating each step of a process of manufacturing a polydimethylsiloxane mold with a concavo-convex part according to an exemplary embodiment of the present disclosure.

Figure 6:
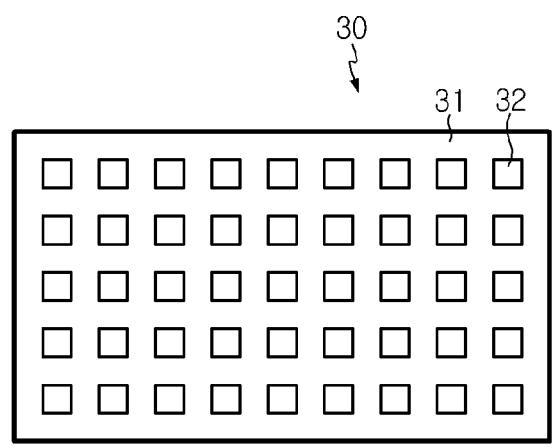
FIG. 6 is a diagram illustrating a chrome mask with openings which are open vertically, according to an exemplary embodiment of the present disclosure.

FIG. 6 is a diagram illustrating a chrome mask with openings which are open vertically, according to an exemplary embodiment of the present disclosure.

Referring to FIGS. 1 through 6, in S101, a chrome mask 30 with pre-designed openings is prepared. Preferably, the openings of the chrome mask 30 are made using AutoCAD.

Preferably, the openings 32 may have a regular arrangement, and the chrome mask 30 may have a regular pattern by the openings 32.

The regular pattern of the chrome mask 30 may be formed by the regular arrangement of the openings 32 formed between structures 31 of the chrome mask 30. According to an exemplary embodiment, the openings 32 may have a cubic shape, and when viewed from the top, the openings 32 may have a rectangular shape.

Preferably, the openings 32 of the chrome mask 30 may have a standard from 0.5 μm to 2 μm in width and length.

Also, preferably, a thickness of the chrome mask 30 may be from 0.5 μm to 2 μm, and a thickness of the openings 32 of the chrome mask 30 may be from 0.5 μm to 2 μm.

According to an exemplary embodiment, the openings 32 forming the regular pattern have a size less than or equal to 2 μm*2 μm*2 μm in width, length, and height, and the size of the openings 32 is equal to an interval between the openings 32.

Figure 3:
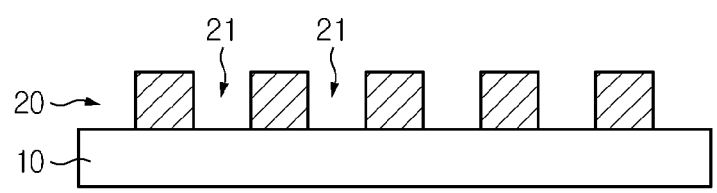

In S103, a photosensitive film 20 is formed on the substrate 10, and after the prepared chrome mask 30 is placed on the photosensitive film 20, a photoetching process that illuminates light is performed, a pattern corresponding to the pattern formed by the openings 32 of the chrome mask 30 is formed in the photosensitive film 20. That is, as shown in FIG. 3, of the photosensitive film 20, an exposed portion is removed and an unexposed portion remains on the substrate 10. Thus, grooves 21 corresponding to the openings 32 of the mask 30 are formed in the photosensitive film 20. The pattern corresponding to the pattern of the openings 32 of the chrome mask 30 is formed.

Figure 7:
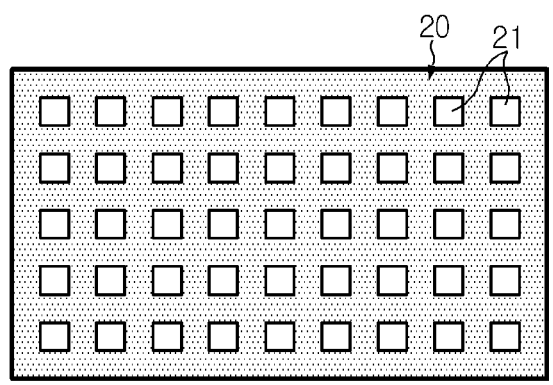
FIG. 7 is a diagram illustrating a substrate with a photosensitive film of FIG. 3, when viewed from the top.

FIG. 7 is a diagram illustrating the substrate with the photosensitive film of FIG. 3, when viewed from the top. Referring to FIG. 7 and FIG. 3, the same pattern as the pattern formed by the openings 32 of the chrome mask 30 is removed from the photosensitive film 20 to form the grooves 21 corresponding to the openings 32 of the chrome mask 30 in the photosensitive film 20.

Figure 4:
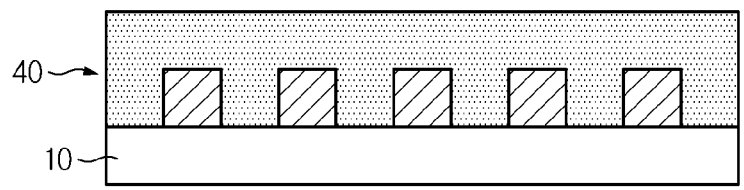

In S105, polydimethylsiloxane (hereinafter referred to as 'PDMS') 40 is poured onto the photosensitive film 20 with the regular pattern corresponding to the openings 32 of the mask 30 in the presence of the grooves 21, and then the PDMS 40 is cured. That is, as shown in FIG. 4, the PDMS 40 is poured over the top of the photosensitive film 20 to fill the grooves 21 formed in the photosensitive film 20, and then the PDMS 40 is cured.

Figure 5:
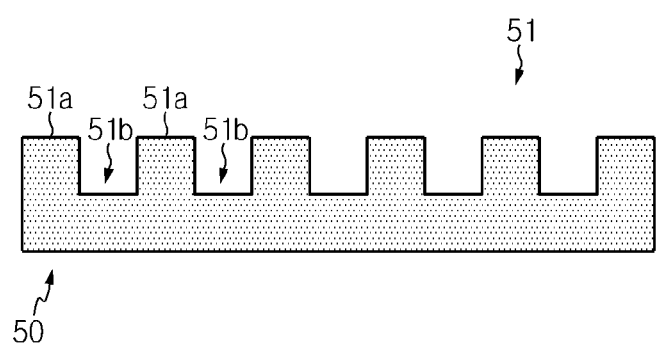
Figure 8:
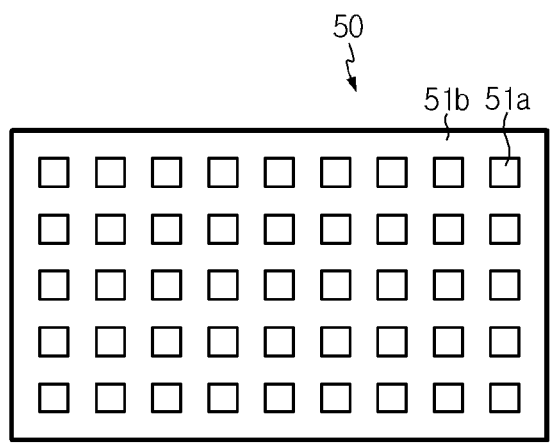
FIG. 8 is a diagram illustrating the PDMS mold of FIG. 5, when viewed from the top.

In S107, the cured PDMS is separated from the photosensitive film 20, so a PDMS mold 50 with a concavo-convex part 51 as shown in FIG. 5 is created. FIG. 8 is a diagram illustrating the PDMS mold of FIG. 5, when viewed from the top. Referring to FIG. 8 and FIG. 5, a structure of the concavo-convex part formed in the PDMS mold 50 is illustrated. When compared to the pattern formed in the substrate 10 by the photosensitive film 20, the concavo-convex part 51 of the PDMS mold 50 may have a reverse shape of the pattern formed in the substrate 10 by the photosensitive film 20. This will be readily understood by referring to FIGS. 2 through 8.

By this process, the concavo-convex part 51 is formed over the surface of the PDMS mold 50. Also, the concavo-convex part 51 includes protrusions 51a protrusively formed at locations corresponding to the grooves 21 formed in the photosensitive film 20, as shown in FIGS. 5 and 8. Also, the concavo-convex part 50 has recesses 51b formed relatively inward when compared to the protrusions 51a, as shown in FIGS. 5 and 8.

That is, the concavo-convex part 51 with a regular pattern may be formed over the surface of the PDMS mold 50. More specifically, the concavo-convex part 51 may be formed in a regularly repeating pattern of the protrusions 51a protrusively formed in the perpendicular direction to the surface of the PDMS mold 50 and the recesses 51b formed inward in the perpendicular direction to the surface of the PDMS mold.

Here, a height of the protrusions 51a may be from 0.5 μm to 2 μm. Also, the height of the protrusions 51a may be determined by the thickness of the photosensitive film 20.

Also, the protrusions 51a have a standard from 0.5 μm*0.5 μm to 2 μm*2 μm in width and length. The standard of the protrusions 51a may be substantially the same as the standard of the grooves 21 of the photosensitive film 20.

According to an exemplary embodiment, the protrusions 51a of the PDMS mold 50 have a standard of 2 μm*2 μm*2 μm in width, length, and height, and an interval between the protrusions 51a is 2 μm.

In S109, to remove impurities and increase the adhesion of a polymer binder slurry, surface treatment is performed on the surface of the PDMS mold 50 where the concavo-convex part 51 is formed. In this instance, the PDMS mold 50 may be surface-treated using $O_2$ plasma surface treatment equipment or corona treatment equipment.

In S111, a polymer binder slurry 62 is coated on the surface of the PDMS mold 50 with the fine pattern to adhere an electrode and a separator thereto.

The polymer binder slurry 62 is a mixture of a polymer binder and a solvent.

The polymer binder may include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose.

Also, the solvent is not limited to a specific type, but may include acetone, methyl ethyl ketone (MEK), toluene, ethylacetate, butylacetate, methanol, ethanol, isopropylalcohol, water, hexane, cyclohexane, dimethyl formamide (DMF), dimethyl acetamide (DMAc), N-methyl-2-pyrrolidone (NMP), and mixtures thereof.

Figure 9:
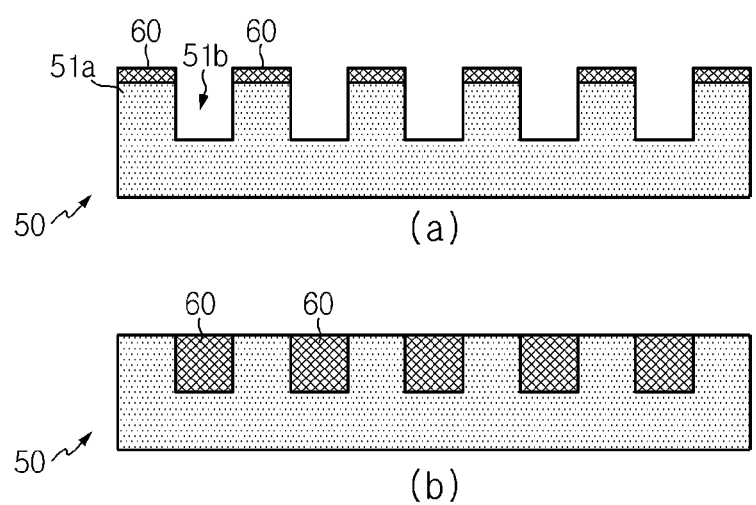
FIG. 9 is a diagram illustrating a polymer binder slurry coated on a PDMS mold.

Preferably, the polymer binder slurry 62 is coated on any one group of the protrusions 51a and the recesses 51a formed in the PDMS mold 50. In this instance, the polymer binder slurry 62 may be coated on the protrusions 51a formed in the PDMS mold 50 using a roller or the like. FIG. 9 is a diagram illustrating the polymer binder slurry coated on the PDMS mold. In FIG. 9(a), the polymer binder slurry 62 coated on the protrusions 51a is shown. In contrast, the polymer binder slurry 62 is coated over the top of the PDMS mold 50, and the polymer binder slurry 62 coated on the protrusions 51a of the PDMS mold 50 is removed, so that the polymer binder slurry 62 may be coated on only the recesses 51b. In FIG. 9(b), the polymer binder slurry 62 coated on the recesses 51b is shown.

Figure 10:
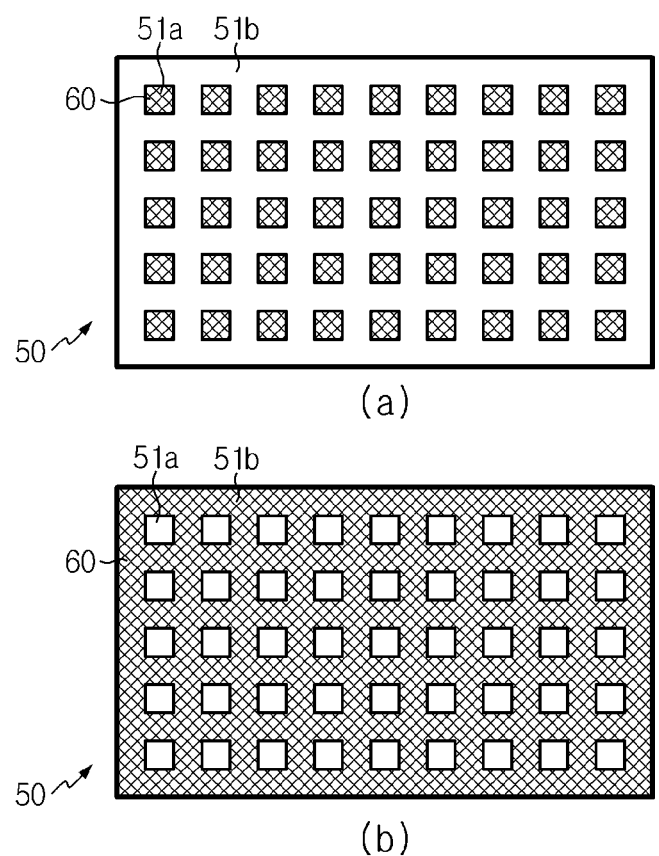
FIG. 10 is a diagram illustrating the PDMS mold of FIG. 9, when viewed from the top.

FIG. 10 is a diagram illustrating the PDMS mold of FIG. 9, when viewed from the top.

In FIG. 10(a), the polymer binder slurry 62 coated on the protrusions 51a of the PDMS mold 50 is illustrated, and in FIG. 10(b), the polymer binder slurry 62 coated on the recesses 51b of the PDMS mold 50 is illustrated. Here, FIG. 10(a) is a top view of FIG. 9(a), and FIG. 10(b) is a top view of FIG. 9(b).

In S113, a rear surface (i.e., a surface opposite to the surface where the protrusions are formed) of the PDMS mold 50 is attached to a flat plate or a roll, and then the polymer binder slurry 62 coated on the PDMS mold 50 is transferred onto the surface of the electrode or the separator. Also, the polymer binder slurry 62 coated on the PDMS mold 50 may be transferred onto a porous coating layer including inorganic particles. That is, when the porous coating layer including the inorganic particles is formed on the separator surface of the secondary battery, the polymer binder slurry 62 coated on the PDMS mold 50 may be transferred onto the porous coating layer.

The polymer binder slurry 62 coated on the PDMS mold 50 is transferred corresponding to the regular pattern formed on the PDMS mold 50 onto the surface of the electrode, the separator, or the porous coating layer, and as a result, an adhesion layer having a cavity part 61 with a regular pattern is formed on the surface of the electrode, the separator, or the porous coating layer. Here, the adhesion layer 60 includes the cavity part 61 and the binder region 62 made of the binder polymer. The binder region 62 refers to a portion where the solvent is removed from the polymer binder slurry 62 coated on the surface of the electrode and the like. In this instance, the cavity part 61 or the binder region 62 may have a regular pattern.

As an example, when the polymer binder slurry 60 is coated on the PDMS mold 50 in shape as shown in FIG. 10(a), the adhesion layer 60 is formed in the shape corresponding to FIG. 10(a). Thus, the binder region 62 has a regularly repeating pattern of rectangles, when viewed from the top. Preferably, the binder region 62 may have a standard from 0.5 μm*0.5 μm to 2 μm*2 μm in width and length.

As another example, when the polymer binder slurry 62 is coated on the PDMS mold 50 in shape as shown in FIG. 10(b), the adhesion layer 60 is formed in the shape corresponding to FIG. 10(b). Thus, the cavity part 61 has a regularly repeating pattern of rectangles, when viewed from the top. Preferably, the cavity part 61 may have a standard from 0.5 μm*0.5 μm to 2*2 μm in width and length.

Also, preferably, a thickness of the adhesion layer 60 may be from 0.5 μm to 2 μm.

Through this, an adhesion layer composite having the adhesion layer with the regular pattern formed on the surface may be manufactured. More specifically, the adhesion layer composite including the electrode of the secondary battery and the adhesion layer, and the adhesion layer composite including the separator of the secondary battery and the adhesion layer may be manufactured.

Figure 11:
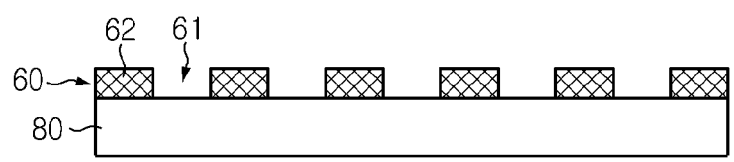
FIG. 11 is a diagram illustrating an adhesion layer composite having an adhesion layer formed on a surface of an electrode of a secondary battery according to an exemplary embodiment of the present disclosure.

FIG. 11 is a diagram illustrating the adhesion layer composite having the adhesion layer formed on the surface of the electrode of the secondary battery according to an exemplary embodiment of the present disclosure. Referring to FIG. 11, the adhesion layer composite includes the electrode 80 of the secondary battery and the adhesion layer 60 having the cavity part 61. Also, the adhesion layer 60 is formed on the surface of the electrode 80 of the secondary battery forming the adhesion layer composite. The adhesion layer 60 has the cavity part 61 as shown in FIG. 11, and the cavity part 61 take a vertically opened shape. The adhesion layer composite may be joined with the separator and the like by the medium of the adhesion layer 60. Although FIG. 11 shows an exemplary embodiment in which the adhesion layer is formed on the surface of the cathode, the adhesion layer may be formed on the surface of the anode.

Figure 12:
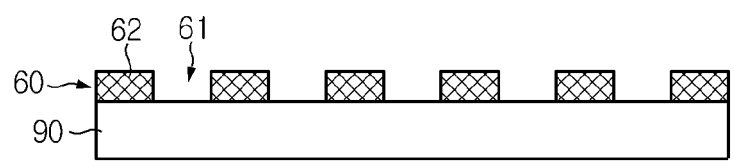
FIG. 12 is a diagram illustrating an adhesion layer composite with an adhesion layer formed on a surface of a separator of a secondary battery according to an exemplary embodiment of the present disclosure.

FIG. 12 is a diagram illustrating the adhesion layer composite having the adhesion layer formed on the surface of the separator of the secondary battery according to an exemplary embodiment of the present disclosure. Referring to FIG. 12, the adhesion layer composite includes the separator 90 of the secondary battery and the adhesion layer 60 having the cavity part 61. Also, the adhesion layer 60 is formed on the surface of the separator 90 of the secondary battery forming the adhesion layer composite. The adhesion layer composite may be joined with the separator and the like by the medium of the adhesion layer 60. As described in the foregoing, a porous coating layer may be further formed on the separator 90, and in this case, the adhesion layer composite may be formed on the surface of the porous coating layer.

Although the exemplary embodiments shown in FIGS. 11 and 12 illustrate that the adhesion layer 60 is formed on any one of the surface of the electrode 80 and the surface of the separator 90, the adhesion layer may be formed on the other surface and the adhesion layer may be formed on both sides.

When transferring the polymer binder slurry 60 coated on the PDMS mold 50, the pressure (i.e., transfer pressure) is preferably stronger than a typical transfer pressure. That is, when transferring the polymer binder slurry 60 using a transfer flat plate or a transfer roller, the transfer pressure applied to the surface of the electrode, the ceramic layer, or the separator is preferably stronger than a transfer pressure applied when forming a traditional adhesion layer. More preferably, the transfer pressure is greater than or equal to 0.3 Mpa.

The polymer binder slurry 60 transferred onto the surface of the electrode, the separator, or the porous coating layer joins the separator and the electrode together under the heat/pressure.

Figure 13:
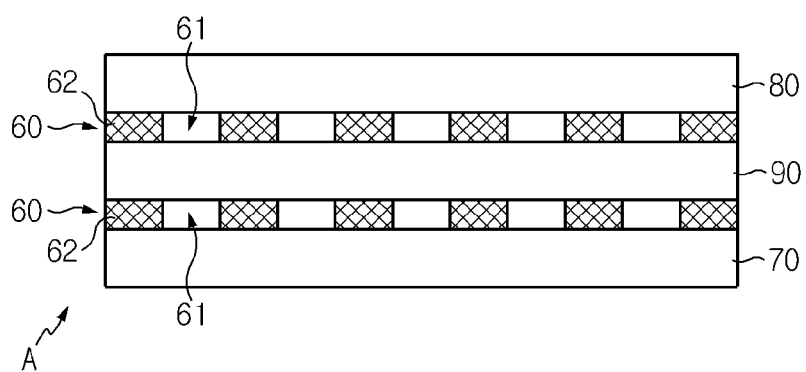
FIG. 13 is a diagram illustrating an electrode assembly including an adhesion layer composite according to an exemplary embodiment of the present disclosure.

FIG. 13 is a diagram illustrating an electrode assembly including the adhesion layer composite according to an exemplary embodiment of the present disclosure.

As shown in FIG. 13, the anode 70 and the separator 90, and the cathode 80 and the separator 90 may be joined with each other by the polymer binder slurry of the regularly repeating pattern, to form an electrode assembly A. Although FIG. 10 shows that the electrode assembly A includes one cathode 70, one separator 90, and one anode 80 joined in a sequential order, the electrode assembly A may include at least two cathodes 80, at least two separators 90, and at least two anodes 70 joined and stacked in a sequential order.

As described in the foregoing, the present disclosure improves the transport of lithium ions while minimizing the size of the adhesion layer between the electrode and the separator. Also, because the adhesion layer with the regularly repeating pattern is formed on the surface of the electrode, on the surface of the separator, or when a porous coating layer is formed on the separator surface, on the surface of the porous coating layer, the present disclosure saves an adhesion layer forming material in the manufacture of the secondary battery, when compared to a related art forming an adhesive coating layer using a binder material.

While the present disclosure has been described hereinabove, it should be understood that various substitutions, modifications, and changes may be made by those skilled in the art within the technical spirit of the invention and the present disclosure is not limited to the disclosed embodiments and the accompanying drawings.

What is claimed is:

1. A method for forming an adhesion layer, comprising:
  preparing a mask having openings which are open vertically;
  etching a photosensitive film through the mask to form grooves corresponding to the openings of the mask in the photosensitive film;
  pouring polydimethylsiloxane onto the photosensitive film having the grooves, curing the polydimethylsiloxane, and separating the cured polydimethylsiloxane from the photosensitive film to manufacture a polydimethylsiloxane mold having a concavo-convex part;
  coating a polymer binder slurry on the polydimethylsiloxane mold having the concavo-convex part; and transferring only the polymer binder slurry directly from the polydimethylsiloxane mold onto a surface of a separator or an electrode of a secondary battery to form an adhesion layer having a cavity part on the surface of the separator or the electrode, the cavity part being open vertically.

2. The method for forming an adhesion layer according to claim 1, wherein the preparing of the mask comprises preparing the mask with a regular pattern by the openings having a regular arrangement.

3. The method for forming an adhesion layer according to claim 2, wherein the concavo-convex part includes protrusions protrusively formed at locations corresponding to the grooves formed in the photosensitive film, and recesses formed relatively inward when compared to the protrusions.

4. The method for forming an adhesion layer according to claim 3, wherein the coating of the polymer binder slurry comprises coating the polymer binder slurry on the protrusions or the recesses.

5. The method for forming an adhesion layer according to claim 4, wherein the coating of the polymer binder slurry comprises coating the polymer binder slurry on the recesses, and the forming of the adhesion layer comprises forming the adhesion layer having the cavity part with a same pattern as the regular pattern formed by the openings.

6. The method for forming an adhesion layer according to claim 4, wherein the coating of the polymer binder slurry comprises coating the polymer binder slurry on the protrusions, and the forming of the adhesion layer comprises forming the adhesion layer having the cavity part with a reverse pattern of the regular pattern formed by the openings.

7. The method for forming an adhesion layer according to claim 2, wherein the preparing of the mask comprises preparing the mask having the openings of a rectangular shape.

8. The method for forming an adhesion layer according to claim 7, wherein the openings have a standard from 0.5 μm*0.5 μm to 2 μm*2 μm in width and length.

9. The method for forming an adhesion layer according to claim 2, wherein the preparing of the mask comprises preparing the mask using the regular pattern pre-designed through CAD.

10. The method for forming an adhesion layer according to claim 1, wherein the mask is a chrome mask.

11. The method for forming an adhesion layer according to claim 1, further comprising:
before the coating of the polymer binder slurry,
performing $O_2$ plasma surface treatment or corona surface treatment of the polydimethylsiloxane mold.

12. The method for forming an adhesion layer according to claim 1, wherein the forming of the grooves in the photosensitive film comprises photoetching the photosensitive film to form the grooves.

13. The method for forming an adhesion layer according to claim 1, wherein the forming of the adhesion layer comprises transferring the polymer binder slurry coated on the polydimethylsiloxane mold onto a porous coating layer including inorganic particles formed on the surface of the separator of the secondary battery, to form the adhesion layer having the vertically opened cavity part on the porous coating layer.

14. A method for forming an adhesion layer, comprising:
preparing a mask having openings which are open vertically;
etching a photosensitive film through the mask to form grooves corresponding to the openings of the mask in the photosensitive film;
pouring polydimethylsiloxane onto the photosensitive film having the grooves, curing the polydimethylsiloxane, and separating the cured polydimethylsiloxane from the photosensitive film to manufacture a polydimethylsiloxane mold having a concavo-convex part;
performing $O_2$ plasma surface treatment or corona surface treatment of the polydimethylsiloxane mold;
coating a polymer binder slurry on the polydimethylsiloxane mold having the concavo-convex part after performing O2 plasma surface treatment or corona surface treatment of the polydimethylsiloxane mold; and
transferring the polymer binder slurry coated on the polydimethylsiloxane mold onto a surface of a separator or an electrode of a secondary battery to form an adhesion layer having a cavity part on the surface of the separator or the electrode, the cavity part being open vertically.

* * * * *